United States Patent [19]

Jenekhe et al.

[11] Patent Number: 4,598,139

[45] Date of Patent: Jul. 1, 1986

[54] COMPLEXES OF POLY (3,6-N-ALKYLCARBAZOLYL ALKENES)

[75] Inventors: Samson A. Jenekhe, Bloomington; Barbara J. Fure, Edina, both of Minn.

[73] Assignee: Honeywell Inc., Minneapolis, Minn.

[21] Appl. No.: 737,612

[22] Filed: May 24, 1985

Related U.S. Application Data

[62] Division of Ser. No. 626,565, Jun. 29, 1984, Pat. No. 4,548,738.

[51] Int. Cl.$^4$ .............................................. C08G 2/00
[52] U.S. Cl. .................................. 528/248; 528/422; 528/423; 252/500

[58] Field of Search ............... 528/248, 422, 423, 490; 252/500, 518; 524/80, 401, 411, 404

[56] References Cited

U.S. PATENT DOCUMENTS

| | | | |
|---|---|---|---|
| 3,882,087 | 5/1975 | Watari et al. | 528/248 |
| 4,344,869 | 8/1982 | Blenne et al. | 252/518 |
| 4,452,725 | 6/1984 | Wellinghoff et al. | 252/518 |

Primary Examiner—Josephine L. Barr
Attorney, Agent, or Firm—Charles G. Mersereau

[57] ABSTRACT

Environmentally stable polymer complexes of processible poly (3,6-N-alkylcarbazolyl alkenes) are disclosed together with a method of making the complexes.

4 Claims, 1 Drawing Figure

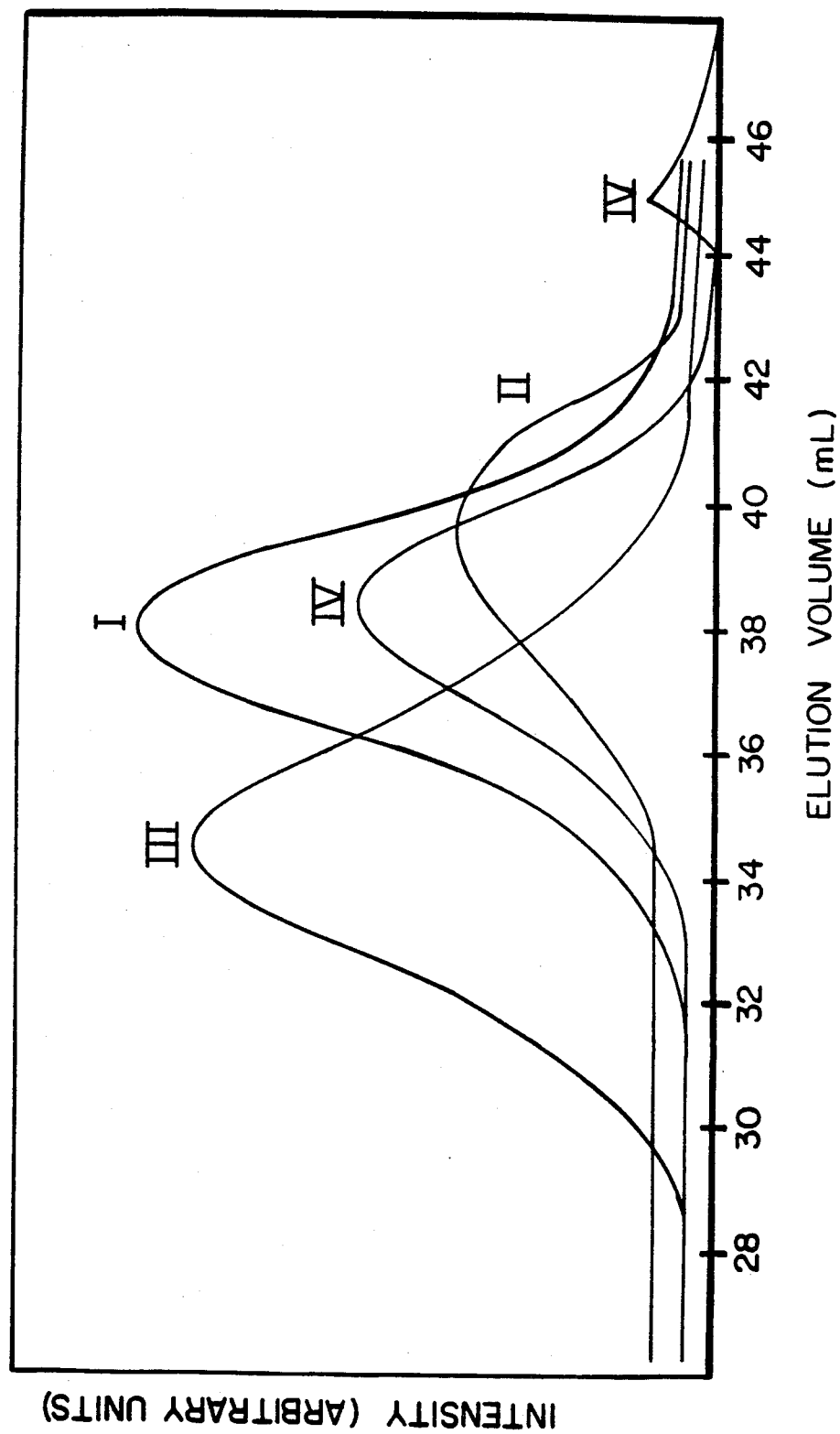

COMPLEXES OF POLY (3,6-N-ALKYLCARBAZOLYL ALKENES)

This application is a division of application Ser. No. 626,565, filed June 29, 1984, now U.S. Pat. No. 4,548,738.

BACKGROUND OF THE INVENTION

1. Field of the Invention

The present invention relates to environmentally stable electrically conducting organic polymers and, more particularly, complexes of processible poly(3,6-N-alkylcarbazolyl alkene) doped with charge transfer acceptors together with a method of making same.

2. Description of the Prior Art

High molecular weight organice polymer materials are generally non-conductive because they do not have free electrons like metals. It has been found, however, that certain high molecular weight materials having intrinsic double bond structures such as polyacetylene, polythiazine and polypyrrole may become highly conductive when doped with certain electron acceptors or donors. These compounds have proved to be of a great deal of interest inasmuch as they may combine some of the traditional properties of organic polymers such as high strength, lightweight, flexibility and low temperature processing together with selective electrical properties including high electrical conductivity. In addition, their cost is relatively low.

Such materials undoubtedly will have an important impact on many areas of technology, especially and electronics industry. For example, experimental batteries made from conducting polymers have been shown to exceed current power sources in both power and energy densities. Other areas of potential applications include chemical or gas sensors, low cost, large area optical sensors, switches, lighweight electrical connections, wire, and in their film form for many types of microelectronic circuits and large area solar cells.

Thus, organic materials that behave as metals or semiconductors will provide the advantages of these materials together with additional advantages of being soluble in organic solvents or having low melting points and glass transition temperatures which both minimize the cost of processing and permit composites to be made with thermally sensitive materials such as doped Si or GaAs, for example. The enormous molecular design flexibility of organic chemistry enables precise tailoring of properties to fill a wide range of applications as enumerated above. In addition, the high strength and conductivity-to-weight ratios lend the advantage of fabrication of many electrical devices of much lower weight than conventional materials.

In the prior art, a large number of polymeric conductors have been made. These include polyacetylene and its analogues which may be doped with $I_2$, $AsF_5$ and $BF_4^-$ or the like. In addition, various phenylene polymers and phthalocyanine complexes have been synthesized as conductive materials.

Highly conducting p-type materials have been obtained by doping the polymer with a charge transfer acceptor such as $I_2$ or $AsF_5$ from the gas or with $ClO_4^-$ or $BF_4^-$ electrochemical oxidation. An n-type material has been achieved by a doping with alkali metal. In known cases of these two types of materials, however, to date only the p-type show any environmental stability.

Theoretically, conductivity takes place both along the polymer chain and between adjacent chains. The active charge carrier, at least in the aromatic materials, is believed to be a bipolaron that is delocalized over several monomer units. The mobility of such a species along the polymer chain is reduced by conformational disorder, necessitating a rigid highly crystalline chain structure for maximum intrachain conductivity. Various mechanisms such as "hopping" and interchain exchange" are thought to be responsible for the interchain part of the conductivity. Unfortunately all of the most highly crystalline polymers of high conductivity are insoluble and infusable. Such is the case with the most common prior art conducting polymer, polyacetylene, which because of this, must be used in the same form as polymerized. In film form it becomes highly porous fibrillar networks which are tough, cheap, and can be electrochemically doped very rapidly. Polyacetylene films have been used in lightweight storage batteries and can also be used to make Shottky barriers which exhibit a photovoltaic effect.

Other slightly less conductive materials include doped poly p-phenylenes; however, poly p-phenylene can be processed only by powder metallurgical techniques, precluding thin film applications. Two solution processible polymers that are known to have been doped to high conductivities in the prior art are poly m-phenylene and poly m and p-phenylene sulfides. $AsF_5$ which has a very high electron affinity has been used succesfully to generate radical cations in these polymers. Unfortunately, these cations are so unstable that crosslinking and ring fusion reactions occur. This, together with high water sensitivity, greatly reduces the utility of the polymers.

Thus, in the prior art, because of the nonprocessibility of these base polymers, thin films and uniform doping have both been difficult to achieve. One attempt to remedy this difficulty consisted of co-evaporating biphenyl with $AsF_5$ to simultaneously polymerize the biphenyl and subsequently dope the p-phenylene polymer on the substrate. This procedure has also been used with several aromatic and heteroaromatic monomers capable of undergoing Lewis acid induced oxidative polymerization with an active radical cation chain end. Invariably black insoluble films of somewhat undetermined composition have resulted. Conductivities as high as $10^{-2}$/ohm-cm were reached, however. This process for generating thin films is somewhat similar to the solid state polymerization of evaporated $S_2N_2$ thin films to a semiconducting $(SN)_x$ of rather low environmental stability.

Other conducting polymers which have been electrochemically synthesized and simultaneously doped are polypyrrole type films which show conductivities as high as $10^2$/ohm-cm, and are stable in air. Unfortunately, these films are also intractable and of somewhat indefinite composition.

Successful environmentally stable doped conducting polymers are described in U.S. Pat. No. 4,452,725 to S. T. Wellinghoff, S. A. Jenekhe (a co-inventor in the present application) and T. J. Kedrowski which is assigned to the same assignees as the present application. That application concerns conducting polymers of N-alkyl 3,6' carbazolyl chemically doped with charge transfer acceptor dopants such as the halogens.

SUMMARY OF THE INVENTION

The present invention provides a new class of organic polymer materials which are solution and/or melt processible to films, fibers, and other shapes, which when doped with suitable electron acceptors exhibit controllable and high p-type conductivity in the range characteristic of semiconductors. This is accomplished through condensation polymerization of 3,6-N-alkyl-carbazolyl with formaldehyde or other aldehydes to high polymers. The polymers are doped with a compatible charge transfer acceptor. This endows the materials with the above polymer properties as well as enhances the conjugation of the base monomer units through chain length extension, thereby lowering the ionization potential and favoring delocalization of electrons.

The undoped materials have good ambient air stability and excellent thermal stability in air up to temperatures above 200° C. The doped polymers are capable of combining high electrical conductivity with good mechanical and thermal stability.

The compounds of the present invention have the general formula:

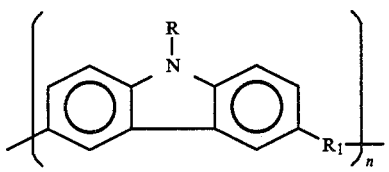

where R is an alkyl group having from 1 to 3 carbon atoms, $R_1$ is an alkene group having from 1 to 3 carbon atoms and n is an integer greater than 1. In the preferred embodiment R is a methyl (—$CH_3$) group and $R_1$ is a methylene (—$CH_2$—) group.

The undoped polymer is prepared by acid catalyzed polymerization of N-alkylcarbazole with an aldehyde. In the preferred embodiment the reactants are N-methylcarbazole and formaldehyde. The acid catalyst is normally sulfuric acid or acetic acid. The doped conducting polymer is obtained from the undoped polymer by a suitable doping process. This may be by exposure of the polymer to a vapor of the dopant or immersion of the polymer in a solution of the dopant.

BRIEF DESCRIPTION OF THE DRAWINGS

The lone FIGURE is a graph showing the molecular weight distribution for the four example polymerizations.

DESCRIPTION OF THE PREFERRED EMBODIMENT

Polymer Synthesis

The preparation of the polymers was achieved by acid-catalyzed condensation polymerization of N-methylcarbazole with formaldehyde. Four samples of poly(3,6-N-methylcarbazolyl methylene) were prepared as in the following Examples I–IV. The basic reaction, in the case of formaldehyde, is as follows:

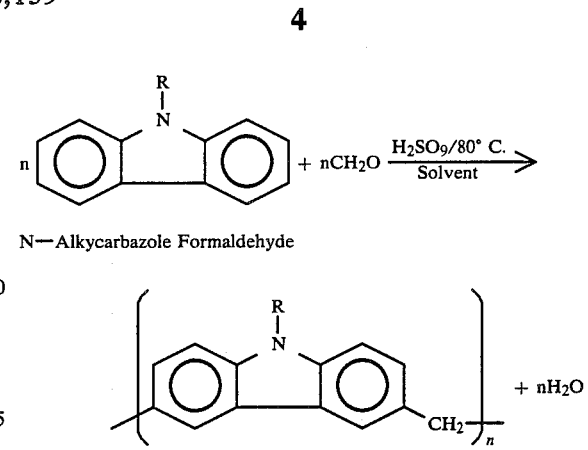

N—Alkycarbazole Formaldehyde

EXAMPLE I

A solution of 1.8124 g (0.01 mole) N-methylcarbazole and 0.01 mole formaldehyde (0.811 g of 37% aqueous solution) in 15 ml dioxane containing 0.184 ml conc. $H_2SO_4$ (d=1.84 g/cm$^3$) was sealed in a 1 inch dia×5 inch long pyrex glass tube. The reaction vessel was heated in an oil bath at 90° C. for 3 hours with continual shaking. Then the reaction mixture was poured into 1.0 liter of well-stirred methanol to precipitate the polymer. The precipitate was dissolved in N-methyl-2-pyrrolidone (NMP) and re-precipitated in methanol to produce a white polymer.

EXAMPLE II

The same procedure as in Example I was used except that 5.4337 g (0.03 mole) N-methylcarbazole, 2.433 g (0.03 mole) 37% formaldehyde solution, 0.55 ml conc. $H_2SO_4$, and 45 ml dioxane was used.

EXAMPLE III 18.124 g (0.10 mole) N-methylcarbazole, 8.11 g (0.10 mole) 37% formaldehyde, 1.84 ml conc. $H_2SO_4$, and 150.0 ml dioxane was prepared in a 500 ml 3-neck flask in flowing argon atmosphere (2 ml/min). After mechanically stirring at 86° C. for 3 hours, the reaction mixture was poured into 3.0 liters of rapidly stirring methanol to precipitate the polymer. The polymer was twice dissolved in 250 ml NMP and precipitated in methanol, giving a white product.

EXAMPLE IV

The same procedure as Example I was used except tht 0.3003 g (0.01 mole) of paraformaldehyde ($CH_2O$)x, was used in place of the formaldehyde solution.

The polymers of Examples I–IV were dissolved in methylene chloride, nitrobenzene or N-methyl-2-pyrrolidone (NMP) solvent and thin polymer films were cast on NaCl plates for infrared spectroscopy. These films were oxidized on the substrates by exposing them either to $I_2$ vapor or a hexane solution of $I_2$ at 50° C., or a solution of $NOBF_4$ (Aldrich) in acetonitrile at 25° C. under nitrogen atmosphere.

POLYMER CHARACTERIZATION

Polymer molecular weight distribution was characterized using a Waters Associate Model 501 Permeation Chromatography (GPC) at room temperature (23° C.). The GPC was packed with $10^5$, $10^4$, $10^3$, and 500A microstyrogel columns in methylene chloride solvent and operated at a flow rate of 2 ml/min. The infrared spectra of the thin polymer films cast from methylene choride solutions were recorded on KCl windows or as free standing films using a Digilab model FTS-14 Fourier transform spectrometer. Electrical conductivity measurements were made on complexed films with a standard four-point probe instrument or a contactless conductivity instrument (Tencor M-gage) operating at 1 KHz.

The poly(3,6-N-methylcarbazolyl methylene) (PMCZM) samples were considerably more soluble and in more solvents than poly(3,6-N-methylcarbazolyl) (PMCZ), as expected. In addition to nitrobenzene which is a good solvent for PMCZ, the methylene linked polymer samples were also soluble in NMP, methylene chloride, THF, DMF, and similar solvents. The molecular weight distribution of the PMCZM samples obtained by GPC analysis is shown in FIG. 1. The numbers I-IV correspond to Examples I-IV. The molecular weight parameters calculated using polystyrene standards are collected together in Table 1. The narrow molecular weight distribution (Mw/Mn) of 1.17-1.51 in the four polymer samples is noteworthy. The effect of polymerization conditions on Mw/Mn is not significant; however, a significant variance between 13-25 is observed in the average DP. Differential scanning calorimetry (DSC) showed only a Tg in the range of 100°-148° C. which increased with increasing molecular weight. The absence of any endothermic peaks in the DSC thermograms up to 300° C. indicated that the polymer samples were amorphous.

TABLE I

Properties of PMCZM Samples

| PMCZM Samples | Mw | Mn | Mw/Mn | DP | Tg (°C.) | $\sigma(\Omega^{-1}cm^{-1})$ |
|---|---|---|---|---|---|---|
| Example I | 2931 | 2497 | 1.17 | 12.9 | 100 | $10^{-3}$ |
| Example II | 4090 | 3221 | 1.27 | 16.7 | 111 | $10^{-3}$ |
| Example III | 7194 | 4767 | 1.51 | 24.7 | 148 | $10^{-2}$ |
| Example IV | 2943 | 2457 | 1.20 | 12.7 | 101 | $10^{-3}$ |

The DC conductivity of iodine-doped PMCZM samples at 23° C. was about $10^{-3}$ to $10^{-2}$ ohm$^{-1}$cm$^{-1}$ as shown in Table I. The effect of molecular weight or DP on conductivity is not yet fully clear, although it appears that the polymer with the longest chain length has the highest conductivity. From studies of p-phenylene oligomers and polymers, it has recently been suggested in the literature that the chain length, beyond a certain minimum may only be of minor relevance to conductivity. Evidently in these polymers, the principal charge transport mechanism is intermolecular, along stacks of face to face packed aromatic rings. Delocalization of carriers along the chain serves mainly to increase the probability of hopping between chains. Beyond a certain conjugation length, one might expect this probability to be unchanged.

The observed moderately high conductivity of oxidized PMCZM suggests the following oxidation mechanism:

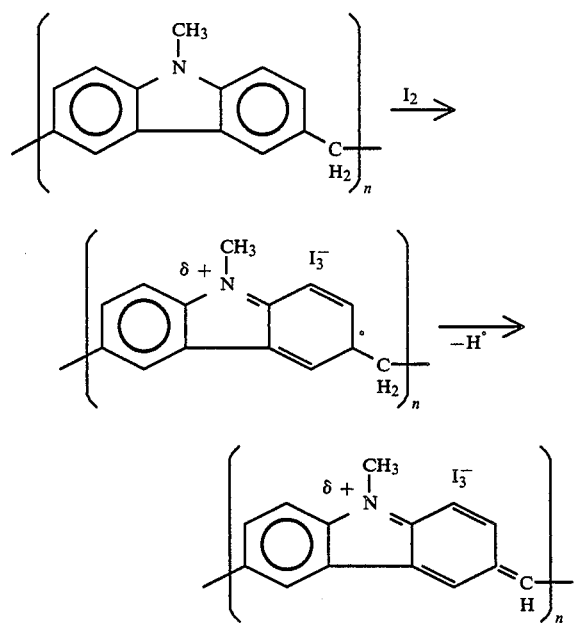

In fact, it is known that a hydrogen of the bridge methylene of 3,3'-N,N'-dimethyl-dicarbazolyl methylene bis can be abstracted as hydride ion by reagents such as triphynelmethyl tetrafluoroborate ($Ph_3C^+BF_4^-$), triphenylmethyl perchlorate ($Ph_3C^+ClO_4^-$), and triphenylmethyl hexachloroantimonate ($Ph_3C^+SbCl_6^-$) or other suitable sources of these anions to form the salt of highly conjugated imine cations analogous to that shown above. The conductivity of iodine complexes of PMCZM is also to be compared to 1-10 ohm$^{-1}$ cm$^{-1}$ typically observed in iodine complexes of the parent unbridged polycarbazoles. The orders of magnitude lower conductivity is conceivably due to a significant number of methylene linkages not converted to methine linkages after complexation.

While the particular embodiment shown is poly(3,6-N-methylcarbazolyl methylene) other polymers prepared with other alkyl carbazoles and aldehydes also produce good results. These include, for example, poly(3,6-N-methylcarbazolyl ethylene), poly(3,6-N-ethylcarbazolyl ethylene) and poly(3,6-N-methylcarbazolyl methylene).

The embodiments of the invention in which an exclusive property or right is claimed are defined as follows:

1. A polymer comprising poly(3,6-N-alkylcarbazolyl alkenes) having the following structure:

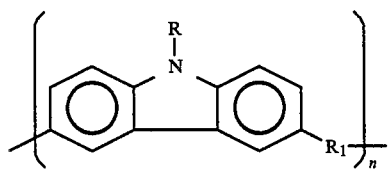

where R is an alkyl group having from 1 to 3 carbon atoms, where $R_1$ is an alkene group having from 1 to 3 carbon atoms, and n is an integer having a value between 2 and 500.

2. The polymer according to claim 1 wherein R is a methyl group (—CH$_3$).

3. The polymer according to claim 1 wherein $R_1$ is a methylene group (—CH$_2$—).

4. The polymer according to claim 2 wherein $R_1$ is a methylene group (—CH$_2$—).

* * * * *